UNITED STATES PATENT OFFICE.

CARL SCHLICKEYSEN, OF STEGLITZ, NEAR BERLIN, GERMANY.

PROCESS OF TREATING RAW PEAT.

No. 807,688. Specification of Letters Patent. Patented Dec. 19, 1905.

Application filed March 18, 1904. Serial No. 198,809.

*To all whom it may concern:*

Be it known that I, CARL SCHLICKEYSEN, manufacturer, a subject of the King of Prussia, German Emperor, residing at No. 6 Friedrichstrasse, Steglitz, near Berlin, Germany, have invented a new Process of Treating Raw Peat, of which the following is a specification.

Raw peat is a product of the more or less advanced decomposition of aqueous plants of fine fibrous structure that existed in the middle zones from one hundred to five hundred years ago, and it is consequently of a very diverse composition, but always having both an internal and an external content of water equal to many times its own weight. The transformation of these aqueous and soft vegetable substances, constituting raw peat, into dry dense peat fuel of high value would be effected by nature in a distant time, some thousand years or more, under advancing decomposition and opening up of the fibrous masses caused by the action of the air contained in the water, during which lapse of time the fibers would become gradually more attenuated and the whole drier and more dense. This transformation of the raw peat by decomposition into solid peat can be effected more rapidly, although no doubt with the sacrifice of its improvement in quality and bulk, if the raw peat be raised out of the water in order to allow access of the atmosphere thereto and be then converted into a homogeneous soft mass by energetic tearing up, mixing, and kneading, which mass then becomes of a cohering sticky condition, owing to the liberation of the agglutinating substances contained in the plant fibers. This material is pressed out in the form of bars of the thickness of an arm, and after cutting into blocks of moderate size it is stacked in the open air to dry. In this mode of proceeding the disadvantages arise, on the one hand, that the peat-blocks are too soft for handling and stacking and are liable to fall to pieces or to be otherwise deformed, and, on the other hand, that in drying the blocks contract and crack under the action of sun and wind and are thus also liable to fall to pieces. According to the present invention these disadvantages are obviated in a simple manner by combining with the raw peat solid substances in a pulverulent, granular, or other small form and of small value.

In view of the low value of the raw peat and the difficulty of freeing it from the water contained in and surrounding it, it is necessary to use substances for the above purpose that are of little value—such as dry peat-dust, comminuted fibrous material, road-sweepings and the like, either sorted or not, dried and comminuted feces, tan residues, and similar materials—the choice of which will depend upon local conditions at the place of manufacture. One or more of these materials are mixed with the raw peat in an ordinary kneading or incorporating machine, so that the peat fibers are made to envelop the particles of solid material, and by this means extensive cracks in the subsequently-formed blocks that would cause falling to pieces are effectually avoided, as only very small, almost invisible, cracks are formed between the contiguous small solid particles. The older and richer the raw peat is the denser and harder will be the blocks formed therefrom, and it is the more necessary to protect the surfaces thereof from the action of sun and wind. Experiments have shown that an extraordinarily good result is obtained by simply coating the surfaces of the blocks with pulverulent or granular or even liquid substances or by strewing such substances on the blocks or rolling these about in the same or otherwise bringing the powdered or granular or liquid material in contact with the blocks, such as by spraying, blowing, &c. The finished malaxated cold raw peat can also on leaving the kneading-machine be pressed through a heated mouthpiece, thereby heating the surfaces of the bars to a slight depth to about the temperature of boiling water while the interior thereof remains cold. By this means in particular the denser richer kinds of peat are rendered more receptive of the pulverulent or granular substances strewed over them. The mixing of the raw part with the pulverulent or granular substances, and the coating or impregnating of the surfaces thereof, can be effected as one continuous process, according to the nature of the peat and the mode in which it is intended to dry the blocks, in particular if the peat is required to issue from the machine in a condition in which it can be at once stacked without requiring, as is otherwise the case, to let it first lie on the ground to dry. The efficacy of the action of the said pulverulent or granular or other small forms of substances upon the more or less soft peat with which they are either mixed or used as a coating depends, as already stated, essentially upon their property of breaking up the soft peat so that each solid particle forms, as it were, a center round which the surrounding fibrous pulp firmly adheres. The action is the more perfect the greater the variety is of the size, nature, and form of the solid particles. In any case the dry peat mass is not brittle, as heretofore, but homogeneous and elastic.

It will be evident that in employing as the pulverulent, granular, or other small bodies to be mixed with the raw peat substances such as peat-dust, tan-refuse, road-sweepings, or even pyrites-powder the further advantage is gained of converting these waste materials into useful combustibles for fuel or for smelting materials.

Having thus described the nature of my said invention and the best means I know of carrying the same into practical effect, I claim—

1. The method of converting raw peat into solid peat fuel, which consists in kneading the raw peat, forming into bars and heating the same superficially while maintaining the interior in its cold state, and permitting to dry.

2. The method of converting raw peat into solid peat fuel, which consists in kneading the raw peat, forcing the plastic mass through a heated mouthpiece to form the same into bars and heat the same superficially while maintaining the interior in its cold state, and permitting to dry.

3. The method of converting raw peat into solid peat fuel, which consists in kneading the raw peat, heating the same superficially as it leaves the kneading-machine in the form of bars while maintaining the interior in a cold state, and permitting to dry.

4. The method of converting raw peat into solid peat fuel, which consists in kneading the raw peat, forming into bars and heating the same superficially while maintaining the interior in its cold state, impregnating the surface with foreign matter, and permitting to dry.

5. The method of converting raw peat into solid peat fuel, which consists in kneading the raw peat, heating the same superficially as it leaves the kneading-machine in the form of bars while maintaining the interior in a cold state, impressing granular matter upon the heated surface of the bars, and exposing to the air to dry.

6. The method of converting raw peat into solid peat fuel, which consists in mixing the raw peat with solid combustible granular matter, kneading the mixture, heating the same superficially to a temperature of approximately 100° centigrade while maintaining the interior in its cold state as it leaves the kneading-machine in the form of bars, impressing granular combustible material upon the heated surface of the bars, and permitting to dry.

7. The method of converting raw peat into solid peat fuel, which consists in mixing the raw peat with hard combustible granular matter, kneading the mixture, and forming the same into bars by forcing the material through a mouthpiece heated sufficiently to raise the outer surface of the peat to a temperature of approximately 100° centigrade, while permitting the interior to remain cold, strewing the outer heated surface of the bars with granular combustible matter and impressing the same thereon, and then permitting to dry.

In witness whereof I have hereunto set my hand in presence of two witnesses.

CARL SCHLICKEYSEN.

Witnesses:
WOLDEMAR HAUPT,
HENRY HASPER.